US 6,708,542 B1

United States Patent
Gafri et al.

(10) Patent No.: US 6,708,542 B1
(45) Date of Patent: Mar. 23, 2004

(54) ELECTROMAGNETIC AND/OR ELECTROHYDRAULIC FORMING OF A METAL PLATE

(75) Inventors: Oren Gafri, Rishon Le-Zion (IL); Yuri Livshiz, Rishon Le-Zion (IL)

(73) Assignee: Pulsar Welding Ltd., Yavane (IL)

( * ) Notice: Subject to any disclaimer, the term of this patent is extended or adjusted under 35 U.S.C. 154(b) by 0 days.

(21) Appl. No.: 10/018,048

(22) PCT Filed: Jun. 14, 1999

(86) PCT No.: PCT/IL99/00321

§ 371 (c)(1), (2), (4) Date: May 20, 2002

(87) PCT Pub. No.: WO00/76685

PCT Pub. Date: Dec. 21, 2000

(51) Int. Cl.$^7$ ................................................. B26P 26/14
(52) U.S. Cl. ................................... 72/56; 72/55; 72/707; 29/419.2
(58) Field of Search .................... 72/56, 55, 60, 72/54, 706, 707; 29/421.1, 421.2

(56) References Cited

U.S. PATENT DOCUMENTS

| | | | | |
|---|---|---|---|---|
| 3,167,043 A | * | 1/1965 | Furth | 72/56 |
| 3,358,487 A | * | 12/1967 | Brejcha et al. | 72/56 |
| 3,495,486 A | * | 2/1970 | Fuchs | 83/53 |
| 3,961,739 A | | 6/1976 | Leftheris | |
| 4,170,887 A | | 10/1979 | Baranov | |
| 4,531,393 A | | 7/1985 | Weir | |
| 4,807,731 A | | 2/1989 | Collins | |
| 5,353,617 A | | 10/1994 | Cherian et al. | |
| 5,442,846 A | | 8/1995 | Snaper | |
| 5,860,306 A | * | 1/1999 | Daehn et al. | 72/56 |

FOREIGN PATENT DOCUMENTS

| | | |
|---|---|---|
| DE | 1 809 070 | 7/1970 |
| WO | WO 97/22426 A2 | 6/1997 |
| WO | WO 99/33590 | 7/1999 |
| WO | WO 99/65636 | 12/1999 |

\* cited by examiner

*Primary Examiner*—Allen Ostrager
*Assistant Examiner*—John S Goetz
(74) *Attorney, Agent, or Firm*—Browdy and Neimark, P.L.L.C.

(57) ABSTRACT

A metal plate is formed in a process comprising cutting, perforating or both, by forcing the plate, by means of an abrupt and intense force towards a mold having openings or boundaries defined by wall sections which extend essentially normal to the forming plane of the mold. Consequently, the plate is cut along the edges of the openings or boundaries. The force may be a pulsed magnetic force or may be a force generated as a result of the discharge of electric current through a fluid.

5 Claims, 12 Drawing Sheets

ELECTROMAGNETIC AND/OR ELECTROHYDRAULIC FORMING OF A METAL PLATE

REFERENCE TO RELATED APPLICATIONS

The present application is the national stage under 35 U.S.C. 371 of international application PCT/IL99/00321, filed Jun. 14, 1999 which designated the United States, and which international application was published under PCT Article 21(2) in the English language.

FIELD AND BACKGROUND OF THE INVENTION

The present invention relates generally to a method and apparatus for forming a metal plate. More specifically, the present invention relates to a method and apparatus for cutting and perforating a metal plate optionally accompanied by forming the plate into a three-dimensional (3-D) shape.

Metal plates of various sizes and thickness are a starting material for the preparation of a variety of objects. Metal plates can be shaped to assume a 3-D shape, may be cut, perforated, etc. Cutting and perforation are achieved in the art by the use of presses, by the use of a laser, etc.

The invention, has at its object to provide a novel cutting and perforation method.

GENERAL DESCRIPTION OF THE INVENTION

The present invention is based on the realization and observation that a metal plate which is intensely forced against a surface with boundaries or openings defined by wall sections essentially normal to the plate and thus parallel to the direction of application of the force is cut along lines defined by said wall sections. In other words, the point of intersection of said wall sections and said surface defines a shearing line and acts as a knife in such a process. Thus, in accordance with the present invention a metal plate is forced against a mold formed with such edges or openings, whereby edge portions (portions defined between a cut line and the edge of the plate) may be cut away and openings (or perforations) formed within the plate. The force, by one embodiment, may be a pulsed magnetic force. In accordance with another embodiment, the force may be that generated by a shock wave generated in a fluid.

The present invention thus provides a method for forming a metal plate, comprising:

(a) providing a mold with a forming plane which in operation faces the plate, having at least one of openings or boundaries defined by wall sections extending essentially normal to said forming plane, edges of said openings or boundaries defining shearing lines;

(b) placing the plate against said forming plane; and (c) generating an abrupt and intense pressure pulse and applying it onto said plate to force it towards said mold, whereby said plate is cut along said cut lines.

The present invention also provides an apparatus for forming a metal plate, comprising:

(i) a mold comprising a forming plane which in operation faces the plate, having at least one of openings or boundaries defined by wall sections extending essentially normal to said forming plane, said openings or boundaries defining cut lines; and (ii) a device for generating an abrupt and intense force pulse and for applying it onto said plate to force it towards said mold, to cut said plate along said cut lines.

In accordance with one embodiment of the invention, said force pulse is a pulsed magnetic force (PMF). The PMF may be generated by a PMF device comprising one or more forming coils, which are typically concentric, placed opposite and proximal to the forming plane and extending peripheral to its boundaries. Each forming coil is connected to an electric discharge circuitry for discharging a short and intense electric current pulse through the forming coil to yield the PMF to form said metal plate.

A background on prior art apparatuses and methods for working of metal workpieces by the PMF process can be found in U.S. Pat. Nos. 3,654,787, 3,961,739, 4,170,887, 4,531,393, 4,807,731, 5,353,617 and 5,442,846, and in PCT Application Publication No. WO 97/22426.

In accordance with another embodiment of the invention, the force pulse is a result of a pressure pulse generated by the breakdown or discharge of an intense electric current through a fluid of a discharge-in-fluid (DIF) device. A DIF device comprises a fluid basin and of electric discharge electrodes embedded within the fluid, which are connected to an electric discharge circuitry for discharging a short and intense electric current within the fluid. The discharge generates an electric spark or breakdown within the fluid which yields the formation of plasma, vapor or both and consequently a pressure wave. The fluid basin has an opening, which may at times be sealed by a flexible membrane, which opening is close proximity, usually in contact with the plate. Thus, the abrupt pressure wave generated within the DIF device is thereby transmitted to the plate. The fluid in the basin is preferably a liquid, particularly an aqueous solution.

In accordance with vet another embodiment, the force pulse is a combined PMF and a DIF generated force. For example, the actual portion of the plate may be formed by a DIF device, while peripheral portions with a PMF; through a forming coil disposed peripheral to a DIF device.

An abrupt and intense pressure may also be achieved by other means such as, for example, by means of an explosive charge.

Where the mold comprises openings, holes will form in the plate at locations corresponding to the openings. For example, where the plate is intended to be used as a satellite dish, such openings may be used as through holes for passing screws through the plate to fasten them to a support structure.

Where the mold comprises said boundaries, edge portions of the plate are cut off along lines defined by said boundaries, with the cut boundaries then defining edges of the formed plates.

As will no doubt be appreciated, at times, a plate may be simultaneously cut along boundaries as well as perforated with holes. Furthermore, typically, the plate is simultaneously shaped to assume a 3-D shape defined by a mold's contours and simultaneously cut along its edges and perforated.

In the case of a satellite dish, it is at times desired (particularly for structure reinforcement) to form a dish with a downward depending peripheral skirt portion relative to its front plane. This requires first bending of its peripheral edge portions and then trimming the bent edge portions so that the skirt will have a desired width. This feat is very difficult to attain in accordance with the prior art. The invention also provides a method and apparatus for the formation of a dish with such a peripheral skirt. A method for forming a metal plate with a depending peripheral skirt portion, in accordance with this aspect, comprises:

(a) providing a mold having an overall annular shape and a forming plane, which in operation faces the plate, having rounded edges;

(b) placing the plate against said forming plane; and (c) generating an abrupt and intense force pulse and applying it onto said plate to force it towards said mold, whereby said plate is formed to assume a 3-D shape corresponding to contours of the mold, while edge portions with edge portions of the plate being bent about said rounded edges; and (d) applying a pulse magnetic force (PMF) onto said edge portion in a direction which is essentially normal to said edge portion against a shearing line defined between a face having said edge portion and a wall portion normal thereto, whereby said edge portion is cut along said shearing line.

This aspect also provides an apparatus for forming a metal plate, comprising:

(i) a mold with a forming plane which in operation faces the plate, having rounded edges;

(ii) a device for generating an abrupt and intense force pulse in an axis essentially normal to said forming plane and for applying it onto said plate to force it towards said mold and to force edged portions of the plate to bend about said rounded edges; and (iii) an auxiliary pulsed magnetic force (PMF) device with an auxiliary forming coil for applying a PMF pulse onto and in a direction essentially normal to the bent edge portion of the plate against an edge portion retaining surface provided with shearing lines defined between said surface and wall portions perpendicular thereto; in an edge-shearing state of the operation the bent edge portion is retained between said surface and said auxiliary forming coil with said shearing line being opposite said auxiliary forming coil, whereby upon discharge of current through said auxiliary forming coil, said edge portion is cut along said shearing lines.

In accordance with one embodiment of the apparatus according to this last aspect, the forming coil is associated with the mold, e.g. placed in a recess in an annular side wall thereof and the shearing line is defined in an annular member which in said edge-trimming operational state is placed opposite said auxiliary forming coil. In accordance with another embodiment, said shearing line is defined in side wall of the mold and the forming coil is received within an edge-trimming operational state is placed opposite said shearing lines.

Said device for generating the intense force pulse may, in accordance with one embodiment, be a PMF device with a forming coil or may be a DIF device.

The present invention is applicable to forming metal plates of different shapes, of different metals, of different thickness, etc. As will be appreciated, the present invention is not limited to plates of any specific specification. The invention may be applied to large plates, to form relatively large objects, e.g. a satellite dish, and may also be applied for forming small components. At times, a mold used may in fact comprise a plurality of sub-mold structures, each defined by boundaries for the simultaneous preparation of a number of different objects from a single plate. In addition, although the present invention is defined with reference to the formation of a plate, it should be understood that at times the object of the process may be the cut-off portions themselves, e.g. portions defined by said openings or the trimmed peripheral edge portions. Thus, for example, openings of a desired shape may be used to define the shape of planar objects which are thus cut-off from the plate by the process of the invention.

In the following, the invention will be described in a non-limiting manner with reference to the annexed drawings.

BRIEF DESCRIPTION OF THE DRAWINGS

FIGS. 14A–14D show an apparatus in accordance with another embodiment of the invention for forming a satellite dish with a depending skirt portion in several successive stages of forming a dish with a.

DETAILED DESCRIPTION OF A PREFERRED EMBODIMENT

Figure 1:
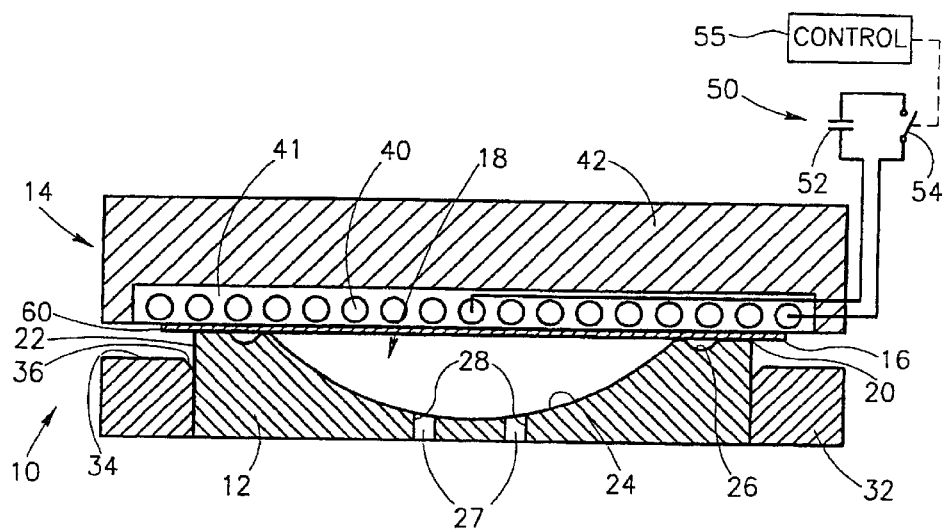
FIG. 1 is a schematical cross-section through a forming apparatus in accordance with an embodiment of the invention, prior to forming the metal plate.

Reference is first being made to FIG. 1 showing an apparatus generally designated 10, comprising a mold 12, a forming coil assembly 14 holding between them a metal plate 16.

Mold 12 has a forming surface 18 of a generally circular shape with edges 20, defined by upright side walls 22 with a central domed-shaped depression 24 and an annular groove 26. The dome-shaped depression has openings 27 defined by upright walls 28. As will be appreciated, the specific shape of the mold which defines the shape of the dish to be formed in the apparatus is an example only and it may assume also a variety of other shapes. By way of illustration, the mold may have an overall rectangular shape, may have different kinds of depressions for forming dishes with different three-dimensional patterns, etc. Thus the specific illustrated embodiment does not derogate from the generality of the invention as defined herein.

Mold 12 is surrounded by an annular member 32 which has an upper surface 34, below edge 20, and having a chamfered inner portion 36 for receiving and holding sheared material waste (see below).

Coil assembly 14 consists of a coil 40, embedded within space 41, formed at the bottom of a supporting block 42. Block 42 is preferably made of a non metallic substance. Coil 40 should be electrically insulated from surrounding metal objects, particularly metal plate 16, for which purpose space 41 may be filled by an electrically insulating material or alternatively coil 40 may be covered by an electrically insulating material.

Coil 40 is electrically connected to an electric discharge circuitry 50 comprising a capacitor battery 52 and a high current rapid discharge switch 54, both as known per se. An example of such a discharge switch is a controlled vacuum discharger such as that disclosed in Application No. PCT/IL97/00383. Switch 54 is controlled by a control circuitry 55.

Metal plate 16 is generally planar and has boundaries such that it extends beyond edges 20 of mold 12.

Figure 3:
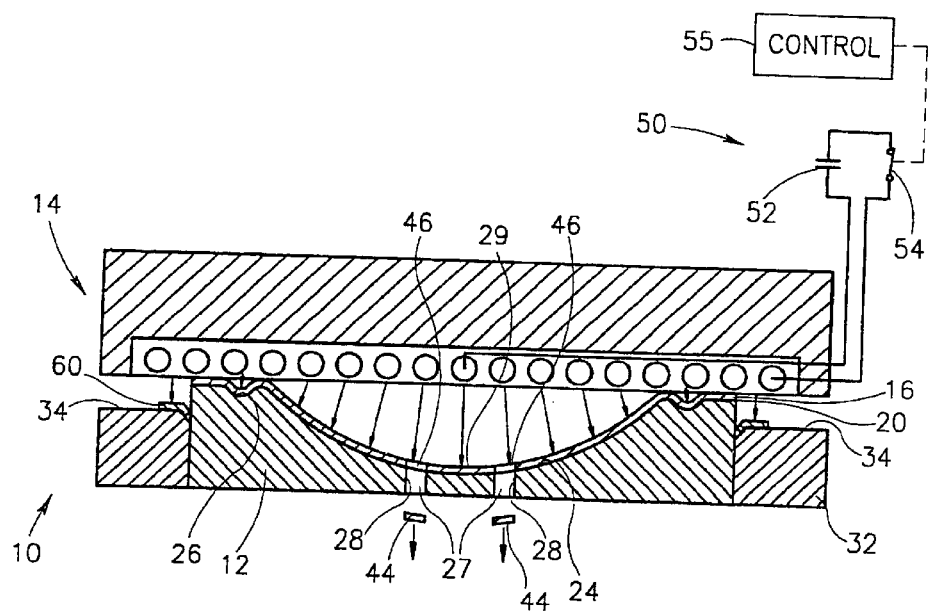
FIG. 3 is a schematical representation of the combined process for shaping, cutting (edge portion-trimming) and perforating using the device of FIG. 1.
Figure 4:
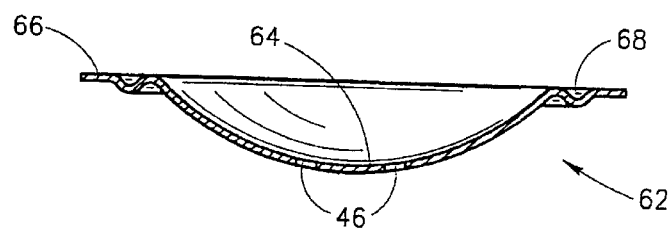
FIG. 4 is a cross-sectional view of a dish formed in the apparatus of FIG. 1 and by the illustrated process.

In operation, as illustrated in FIG. 3, switch 54 is closed, whereby electric current rapidly discharges through coil 40 yielding a pulsed magnetic force which induces a very rapid movement in portions of plate 16: portions overlaying depression 24 and annular groove 26 are deformed to assume a three-dimensional shape defined thereby and peripheral edge portions 60 of plate 16 are sheared over peripheral edges 20 of the mold 12. In addition, when the portion 29 of the plate impacts the bottom walls of depression 24, small portions 44 are cut-off from portion 24, leaving holes 46 of a diameter corresponding to that of openings 27. Portions 44 continue to move through openings 27 and are thereby discharged. Thus, a dish 62 as shown in FIG. 4, having a central concave depression 64 with holes 46 and a planar edge portion 66 with an annular groove 68 is thereby formed. Such a dish is useful, for example, as an antenna, in particular such used in satellite communication. Annular member 32 can then be pushed upwards to allow disposal of sheared portion 60.

Figure 2:
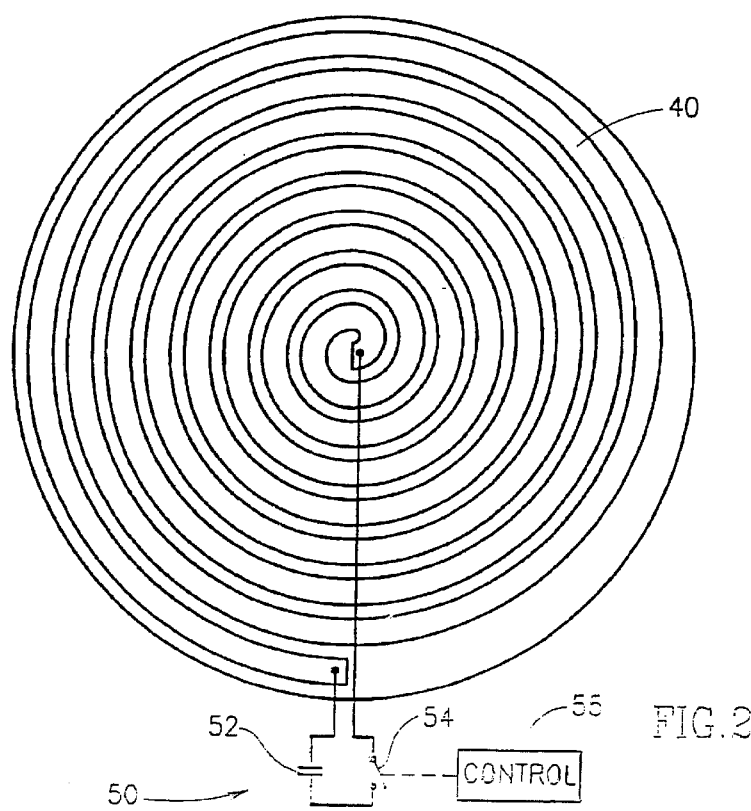
FIG. 2 is a top elevation of the coil of the apparatus of FIG. 1.
Figure 5A:
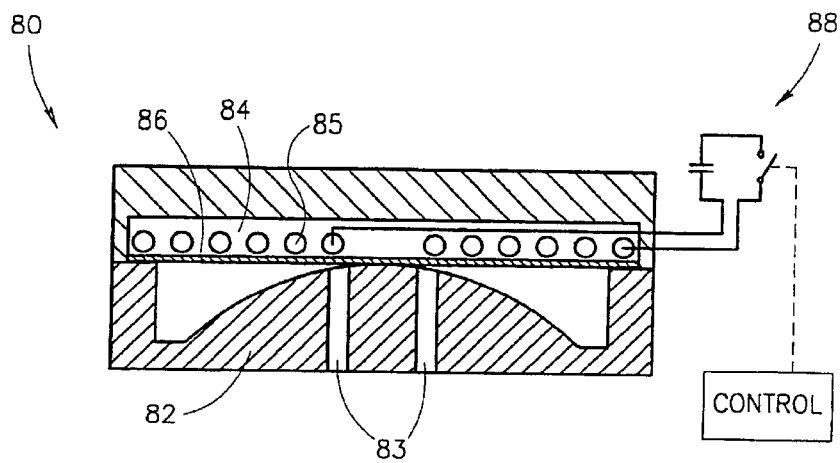
FIG. 5A is a schematical cross-section through a forming apparatus in accordance with another embodiment of the invention.
Figure 5B:
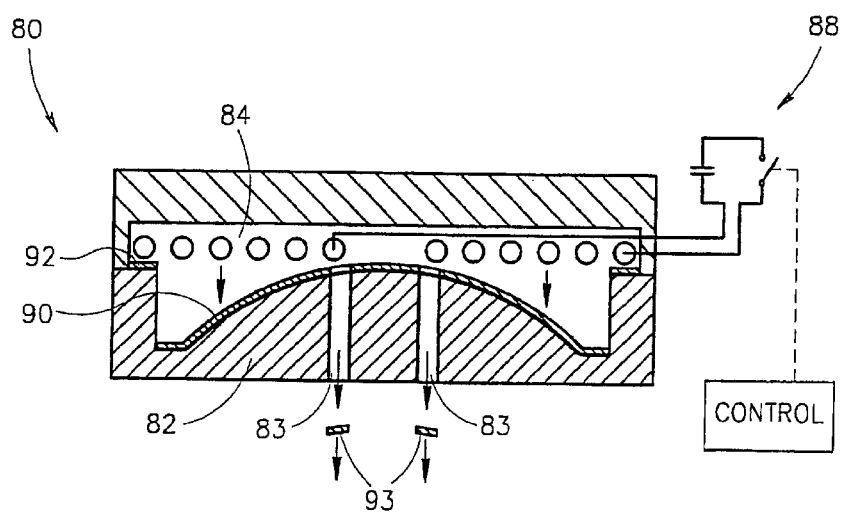
FIG. 5B shows the apparatus of FIG. 5A after the combined shaping, cutting and perforation to yield a formed dish.

Reference is now being made to FIGS. 5A and 5B showing an apparatus generally designated 80 in accordance with another embodiment of the invention. The apparatus comprises a mold 82 with openings 83 and a forming coil assembly 84 with a coil 85 holding between them a metal plate 86. A discharge circuitry 88 is connected to coil 85. A major difference between apparatus 80 of FIGS. 5A and 5B and apparatus 10 of FIG. 1 resides in that the mold, rather than being concave is convex. Otherwise, the operation of the apparatus is essentially similar to that described with reference to FIGS. 1–3 with FIG. 5B illustrating the apparatus after dish 90 with edges 91 has been formed from plate 86 leaving behind an annular trimmed edge portion 92 and small cut-off portions 93 which are expelled through openings 83. As the process is essentially the same as that described with reference to FIGS. 1–3 the description will not be repeated again and the reader is referred to the description above.

Figure 6:
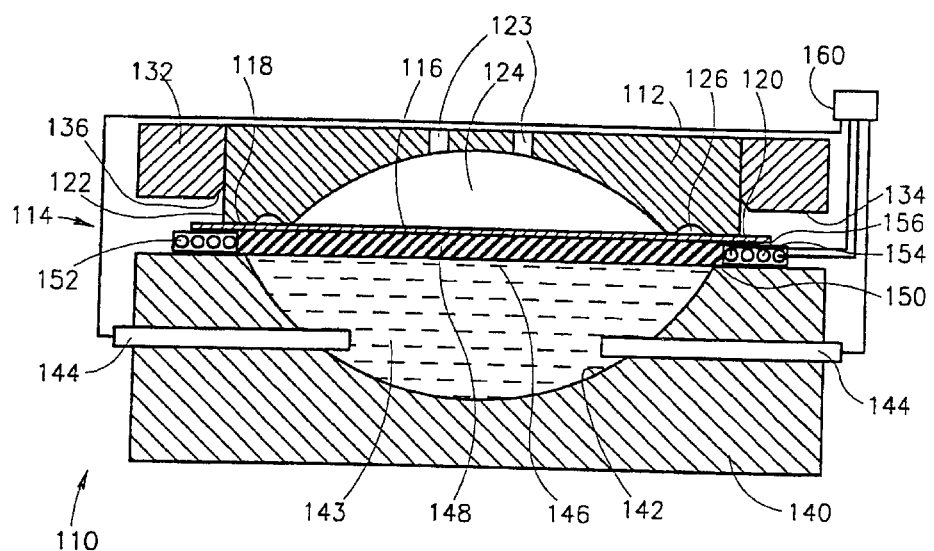
FIG. 6 is a schematical cross-section through a forming apparatus in accordance with another embodiment of the invention, prior to forming the metal plate.

Reference is now being made to FIG. 6 showing an apparatus generally designated 110 comprising a mold 112 and a force generating assembly 114 holding between them a metal plate 116.

Mold 112 has a forming surface 118 of a generally circular shape with edges 120 defined by upright walls 122, a central dome-shaped depression 124 with openings 123 and an annular groove 126. Similarly as in the case of FIG. 1, the specific shape of the mold which defines the shape of the dish to be formed in the apparatus is an example only and it may assume also a variety of other shapes. By way of illustration, the mold may have an overall rectangular shape, may have different kinds of depressions for forming dishes with different three-dimensional patterns, etc. Thus the specific illustrated embodiment does not derogate from the generality of the invention as defined herein.

Mold 112 is surrounded by an annular member 132 which has an upper surface 134, at a distance from planar surface 118, and having a chamfered inner portion 136 for receiving and holding sheared material waste (see below).

Force generating assembly 114 comprises a PMF device, generally designated 140 comprising a fluid basin 142 holding fluid 143 having disposed therein a plurality of discharge electrodes 144 (two are shown in this cross-section but it can be appreciated that a larger number at varying locations within the basin may be provided). Fluid 143 is typically, but not exclusively a liquid, typically an aqueous solution. Fluid 143 may also, at times, be a gas. The basin has an opening 146 sealed by a flexible planar wall 48 extending over and fixed to edges 150 of the opening (the manner of fixing may be as known per se and is not shown).

The size of opening 146 is such so that it is opposite the major depression 124 of the mold and preferably also opposite other depressions, such as depression 126.

Force generating assembly 114 further comprises a planar coil member 152 arranged so as to define a frame around opening 146 and has a face 154 which faces the metal plate which is in close proximity to metal plate 116. The position and size of coil member 154 is such so that it is opposite portion of plate 116 including such portions which are opposite edge 120 and extending peripherally therefrom. As will be appreciated, the forming coil 156, within forming coil member 152, should preferably be electrically insulated both from plate 116 as well as from other electrically conducting objects, such as the body of device 140 in case this is made of metal or another conducting substance. It is to be noted, however, that the body of the device is preferably made of a non-metallic rigid substance, of a rigidity such that it can withstand the pressure generated within basin 142) and accordingly it may be embedded in or covered by an electrically insulating material.

Electrodes 144 and forming coil 156 are electrically connected to an electric discharge circuitry 160.

Figure 7:
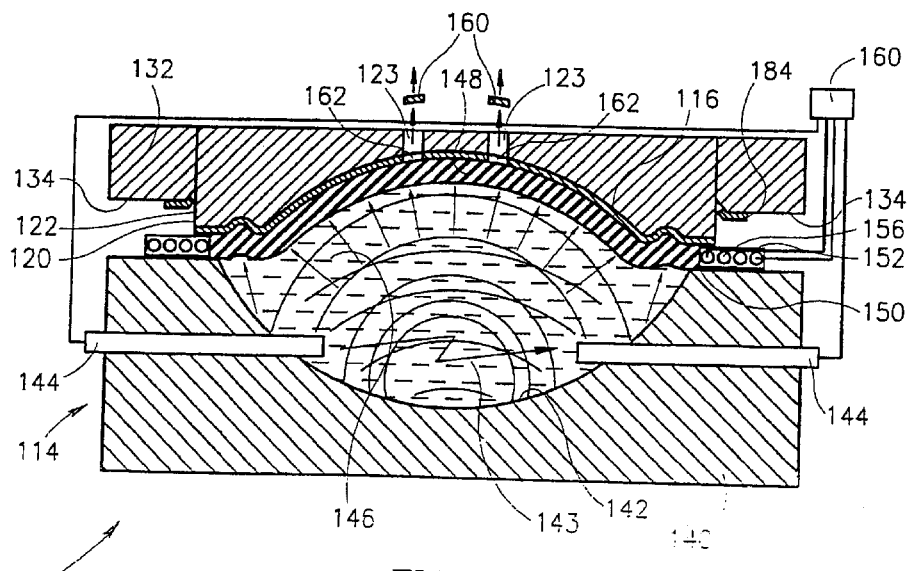
FIG. 7 is a schematic representation of the combined process for shaping, cutting (edge-trirnming) and perforating, using the device of FIG. 6.

Referring now to FIG. 7, upon activating of electric circuitry 160, current is simultaneously discharged through electrode 144 and coil 156. The discharge through electrodes 144 yields generation of a spark within basin 142, causing plasma and vapor formation in liquid 143. This gives rise to a pressure wave applying pressure on flexible wall 148 which thereby deforms the central portion of metal plate 116 into the depression 124. Upon impact with the walls of the depression portions 160 are cut-off and expelled through openings 123, leaving behind holes 162 in the plate. The electric discharge through coil 156 gives rise to a pulsed magnetic force in the peripheral portions of the plate shearing these peripheral portions 184 off. Thus, a dish similar to that of FIG. 4 is formed.

Figure 8:
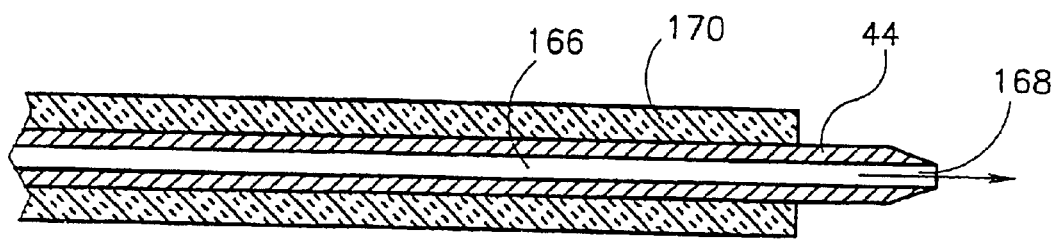
FIG. 8 is an enlarged cross-sectional view of the PDF electrode in the apparatus of FIG. 1.

A schematic representation of the structure of electrode 144 is shown in FIG. 8. Electrode 144 is formed from a metal tube with a lumen 166 having a tapered discharge end 168. The electrode is coated by an electrically insulating layer 170. Lumen 166 is connected to a gas source, e.g. air, which is supplied by a compressor or a compressed gas reservoir (not shown). Such gas is allowed to sip into basin 142 facilitating the generation of electric discharge and the formation of plasma within liquid 143 (typically an aqueous solution) contained in basin 142. In some embodiments of the invention the electrode may comprise a single conductivity (non-gas transmitting) tip.

In the case of electrodes of the kind shown in FIG. 8, or electrodes comprising a single conducting tip, each pair of electric discharge members is constituted by two electrodes.

Figure 9:
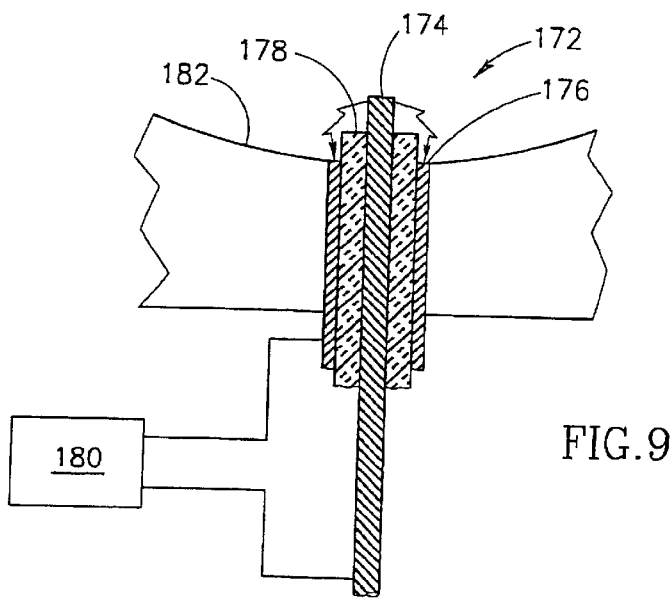
FIG. 9 is an enlarged cross-sectional view of a PDF electrode in accordance with another embodiment of the invention.

Another embodiment of an electrode 172 in accordance with the invention can be seen in FIG. 9. The electrode 172 of this embodiment, is a co-axial electrode with a central electrode member 174 and a peripheral annular electrode member 176, the two being isolated by an electrically non-conducting layer 178. Members 174 and 176 are connected to a discharge circuitry 180. In this way, upon discharge of the intense and rapid electric current pulse, a spark will be generated between pole 174 and pole 176.

It should be noted, that in some other embodiments, the body of the basin 182 may form one of the discharge members of a discharge pair and thus the discharge will be between an electrode and the body.

Figure 10:
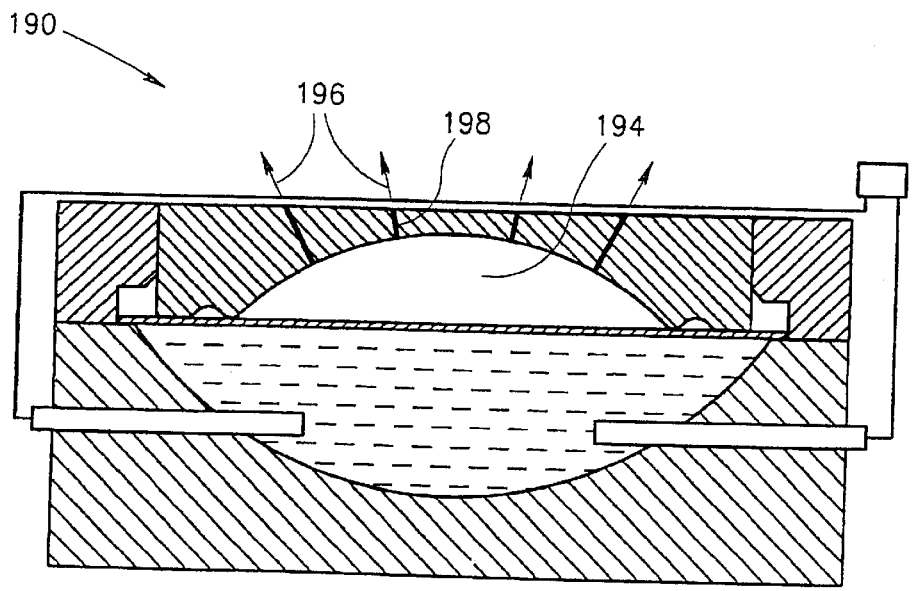
FIG. 10 is a schematic cross-section through a forming apparatus in accordance with another embodiment of the invention prior to forming the metal plate.

An apparatus 190 in accordance with another embodiment of the invention can be seen in FIG. 10. The apparatus 190 differs from apparatus 10 shown in FIG. 1 in that (i) it does not comprise a flexible wall and thus the fluid within the basin is in direct contact with the metal plate; and (ii) in that it does not comprise a peripheral shearing coil. In the case of apparatus 190 the pressure wave generated within the liquid hits the plate directly causing it to deform and shearing its peripheral portions. Furthermore, the mold in this device does not have openings. Rather, it is provided with a plurality of vacuum ducts 192 leading from the space within depression 196 to a vacuum source (not shown) which draws gas therefrom (represented by arrows 198).

Figure 11:
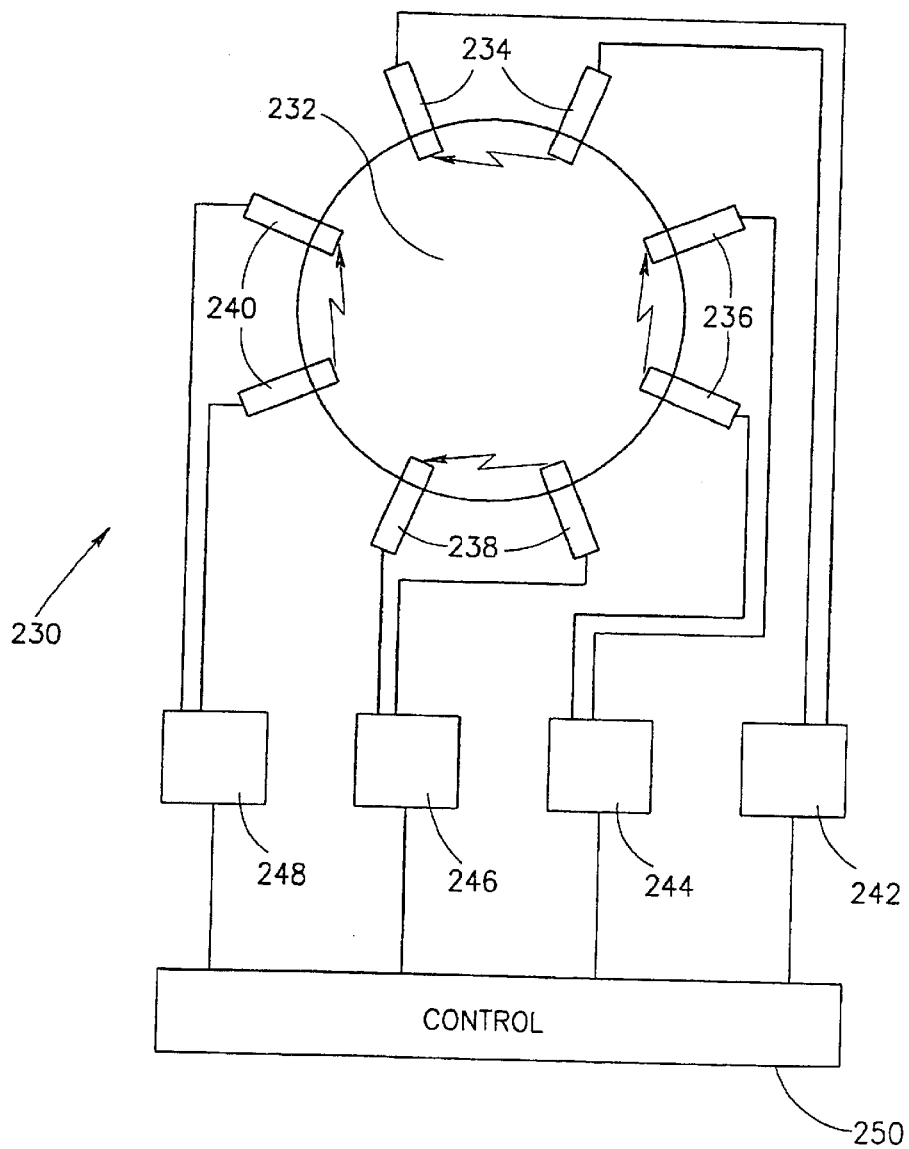
FIG. 11 is a schematic, planar representation of a forming apparatus in accordance with another embodiment of the invention.

Reference is now being made to FIG. 11 showing an apparatus generally designated 230 comprising a fluid basin 232 with a plurality of electrodes 234, 236, 238 and 240. Each pair of electrodes (234, 236, etc.) being connected to a corresponding discharge circuitry 242, 244, 246 and 248, respectively, which are under control of a control circuitry 250.

An electric current is discharged between each pair of electrodes and can be timed such that all discharges will be simultaneous or such that current will be discharged through different pairs in a predetermined sequence.

Figure 12A:
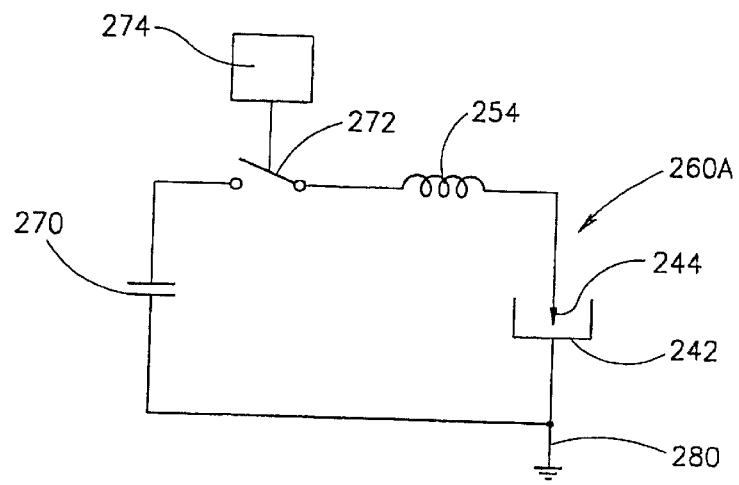
FIGS. 12A and 12B are schematic illustrations of two alternative electric circuitries for discharging the rapid intense electric current pulse through the PDF electrodes and through the forming coil in the apparatus of FIG. 6.
Figure 12B:
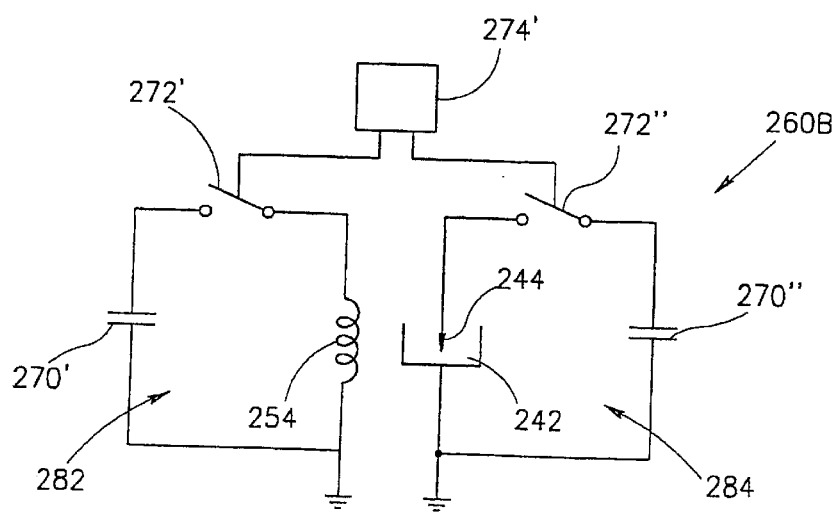

Two embodiments of electric discharge circuitries 260A and 260B, are shown in FIGS. 12A and 12B, respectively. Discharge circuitry 260A comprises an electric power source 270, which may be a capacitor or a bank of capacitors, a high current rapid discharge switch 272, e.g. a controlled vacuum discharger (which may be any such device known per se, or such as that disclosed in PCT Application No. PCT/IL97/00383) and a triggering unit 274 which actuates discharge of switch 272. The switch and the power source are connected in series with forming coil 254 and with electrodes 244 embedded within basin 242. The electric discharge circuitry is typically grounded at 280. Upon triggering by trigger units 274, switch 272 closes, thus giving rise to current discharge through coil 253 in electrodes 244.

In the case of the alternative electric circuitry 260B rather than having coil 254 and electrodes 244 connected in series, there are provided two parallel circuits 282 and 284, the first for discharging current through coil 254 and the latter for generating electric discharge through electrodes 244 within basin 242. The electric switches 270' and 270" in the two circuitries are triggered in parallel by a triggering unit 274'. Both electric circuitries 282 and 284 have their independent power source 270' and 270". Electric circuitry 260B shown in FIG. 5B is useful in the case of an impedance mismatch between the electrodes and the coil.

Figure 13A:
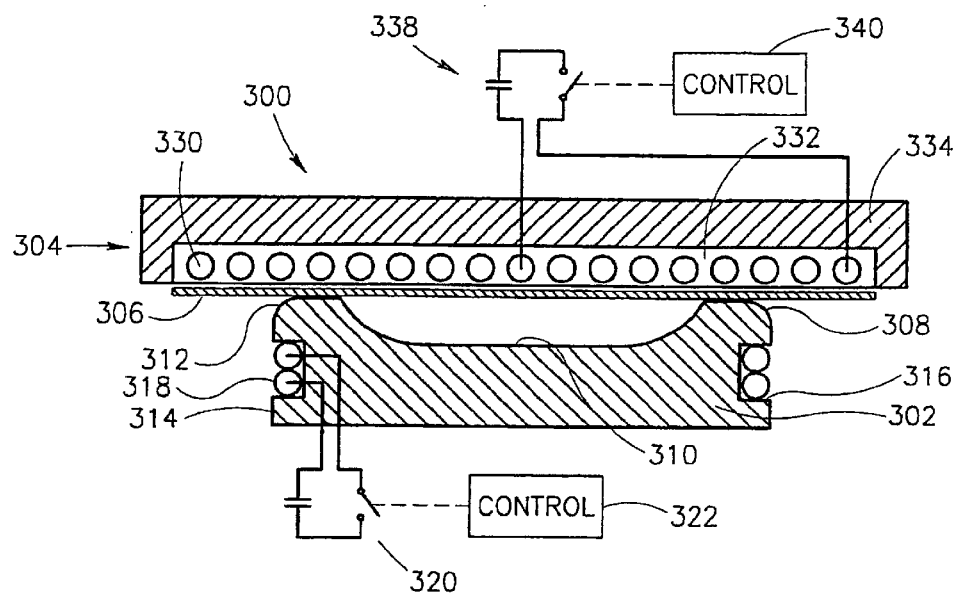
FIGS. 13A–13D show an apparatus in accordance with another embodiment of the invention for forming a satellite dish with a depending skirt portion in several successive stages of forming a dish with a skirt.

Reference is now being made to FIG. 13A showing an apparatus generally designated 300 comprising a mold 302 and a primary forming coil assembly 304, holding between them a metal plate 306. Mold 302 has a forming plane 308 with a central inverted dome-shaped depression 310, rounded edges 312, and essentially upright annular side walls 314. Received within an annular groove 316 of the side walls is an auxiliary edge-trimming coil 318 connected to a discharge circuitry 320 which is under control of control unit 322. As will be appreciated, where mold 302 is made of metal, it is necessarily to properly isolate coil 318 therefrom.

Coil assembly 304 consists of a primary coil 330 contained in a coil holding receptacle 332 within a coil support block 334. Here again, as will be appreciated, it is necessary to ensure proper isolation of coil 330 from both block 334, if made of metal, and plate 306. Coil 330 is connected to a discharge circuitry 338 controlled by control unit 340. As will be appreciated, control mechanism 340 may be combined with control mechanism 322.

Figure 13B:
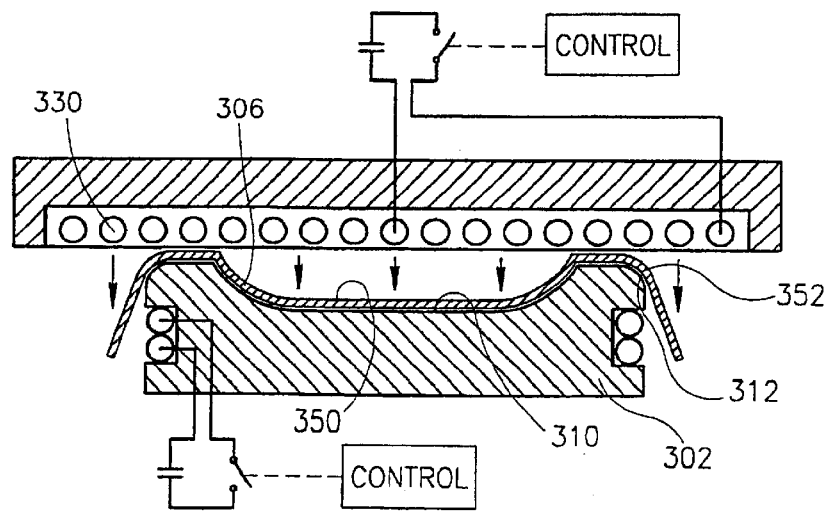

As illustrated in FIG. 13B, upon discharge of electric current through coil 330, the magnetic force forces plate 306 towards the mold, whereby the central portion 350 assumes the shape of depression 310 while the edge portions 352 bend over the rounded edges 312.

Figure 13C:
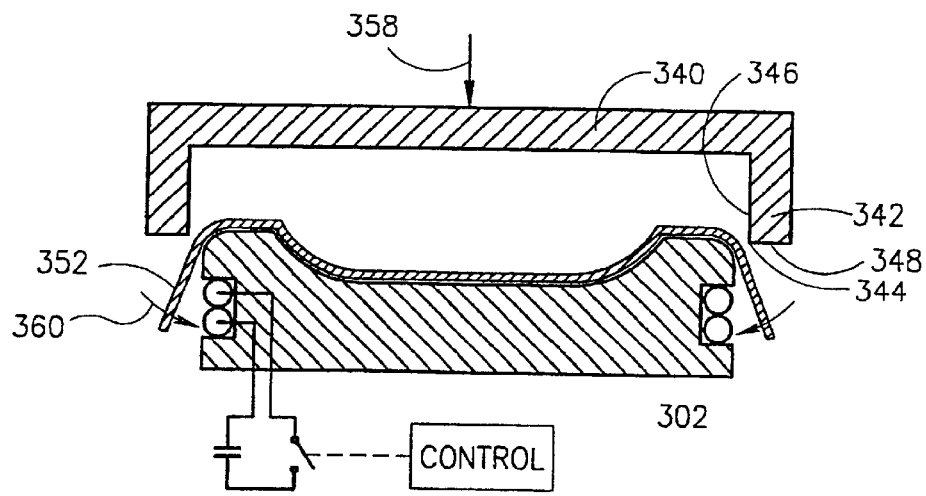
Figure 13D:
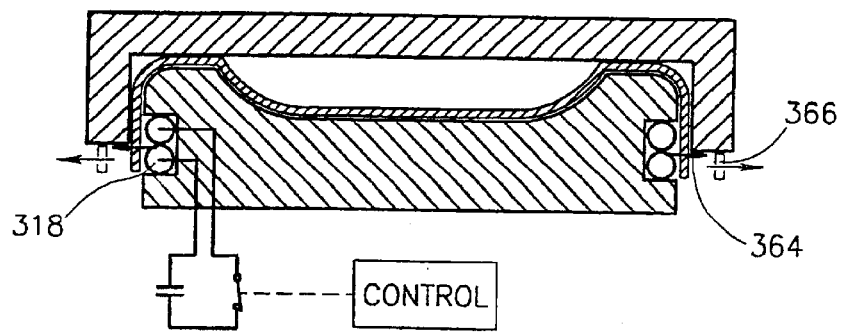
Figure 13E:
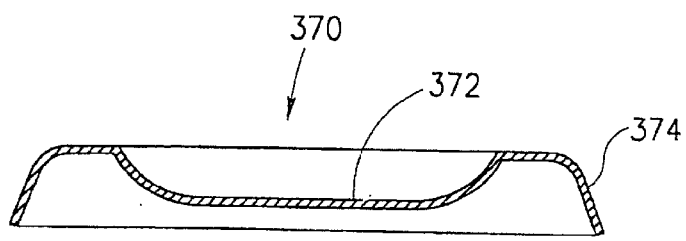
FIG. 13E shows the dish formed by the apparatus of FIGS. 13A–13D.

At the next stage of the process, illustrated in FIG. 13C, coil assembly 304 is removed and a body 340 having upright downwardly extending annular members 342 with a right angled shearing edge 344 defined between face 346 and wall portion 348 is brought instead. Body 340 is lowered over the mold in a direction represented by arrow 358. This causes the forced bending of edge portions 352 as represented by arrows 360 to reach the stage as illustrated in FIG. 13D. Then, as also represented in the last figure, current is discharged through edge trimming coil 318 generating a magnetic force in a direction represented by arrows 364 thus shearing the peripheral edged portion 366 represented by dashed lines in FIG. 13D. After removal of body 340 the edge portions somewhat recoil. Thus, a formed plate 370 with a central recess 372 and an annular skirt portion 374, as seen in FIG. 13E, is formed.

Figure 14A:
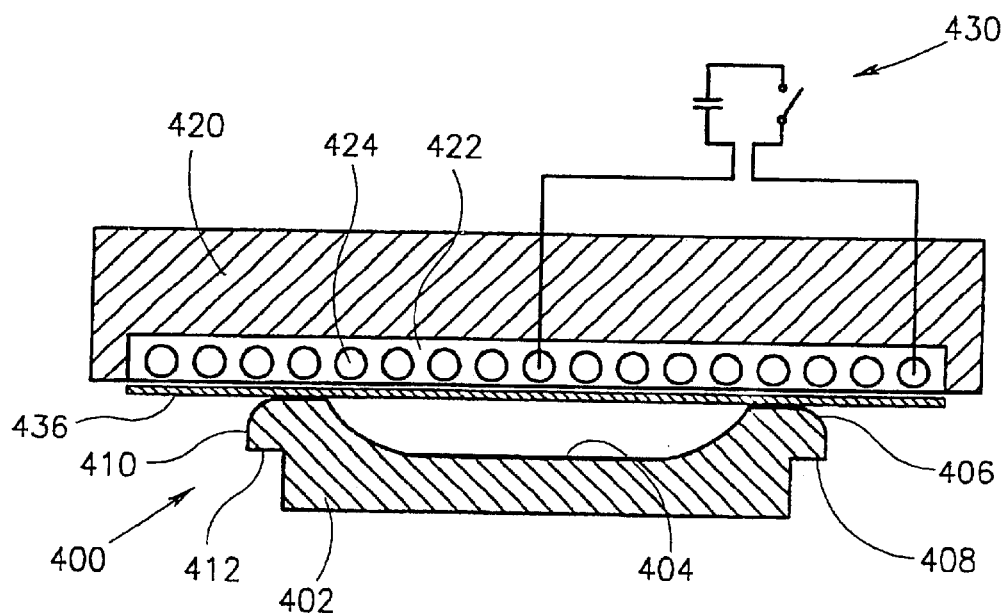

An apparatus 400 in accordance with another embodiment, also useful for forming a plate with an annular skirt portion, and the process of forming using this apparatus, is seen in FIGS. 14A–14D. Referring first to FIG. 14A, the apparatus comprises a mold 402 with a central depression 404 and rounded edges extending downward to an annular shearing edge 408 defined between the annular side wall of the mold 410 and laterally extending wall portion 412. The apparatus also comprises a primary forming coil assembly 420 with a coil receptacle 422 holding a primary forming coil 424, with the coil connected to a discharge circuitry 430. Held between mold 402 and forming coil assembly 420 is a metal plate 436.

Figure 14B:
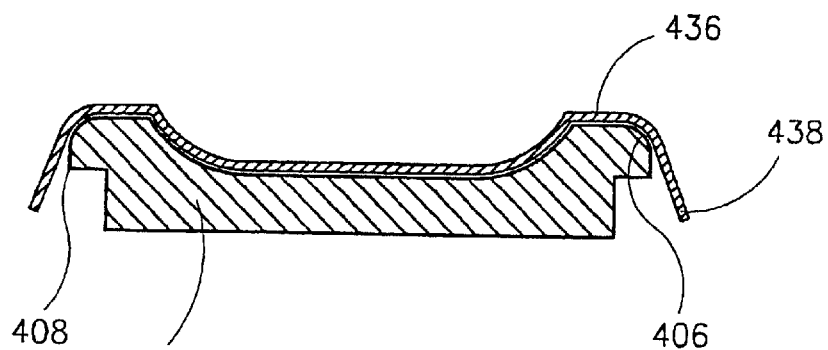
Figure 14C:
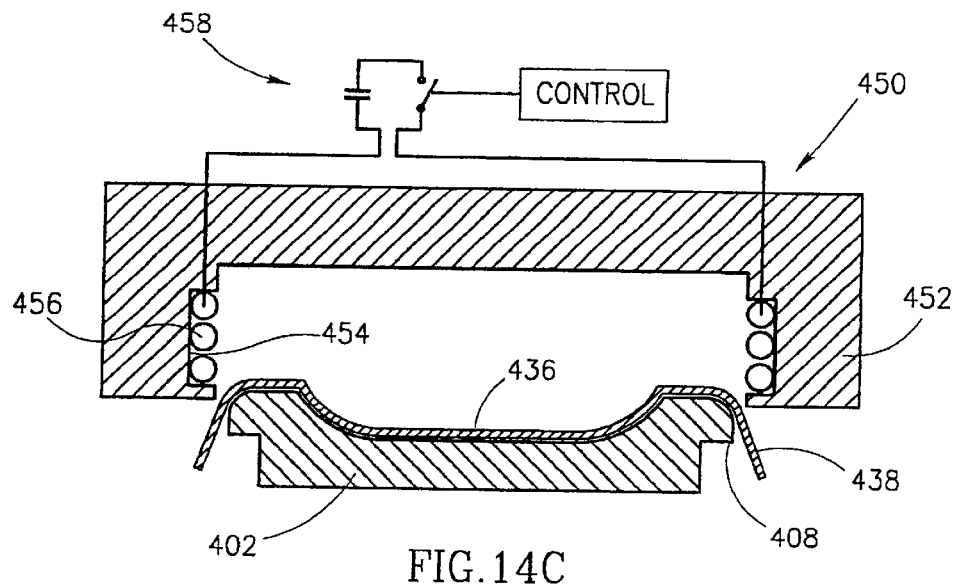
Figure 14D:
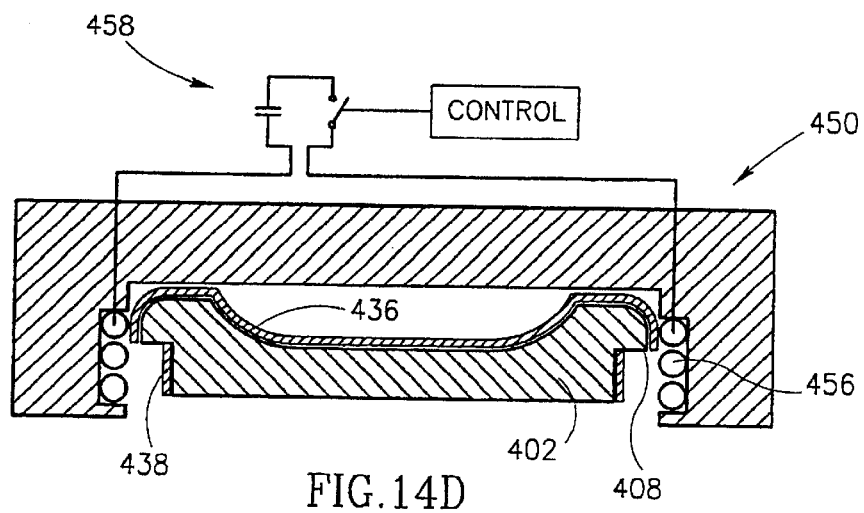

After discharging of current through forming coil 424, plate 436 is shaped, in a similar manner to that represented in FIG. 13B, to assume a shape as shown in FIG. 14B, with edge portions 438 bent about rounded edges 406 extending below shearing edge 408. After this step, the forming coil assembly 420 is removed and replaced by a forming coil holding assembly 450 with downwardly projecting annular member 452 holding within a recess 454 formed in an inner face thereof; an auxiliary forming coil 456. The auxiliary forming coil 456 is connected to a current discharge and control circuitry 458.

Figure 14E:
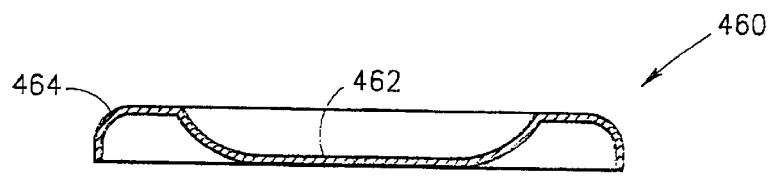
FIG. 14E shows the dish formed by the apparatus of FIGS. 14A–14D.

Upon association of assembly 450 and mold 402 with the initially formed plate 436, the edge portion 438 of the plate is further bent, in a manner analogous to that of FIGS. 13C–13D, and the auxiliary coil 456 comes to lie opposite the sharing edge 408. Upon discharge of current through forming coil 456 the peripheral edged portion 438 is sheared over shearing edge 408. Additionally, this PMF also forces the remaining part of the edge portion against the side wall of the mold to assume a shape defined by its contours. Thus a formed plate 460, as seen in FIG. 14E with a central recess 462 and an annular skirt 464 is formed.

What is claimed is:

1. A method for forming a metal plate (306, 436) comprising:

(a) providing a mold having an overall annular shape and a forming plane, which in operation faces the plate and which has rounded edges;

(b) placing the metal plate against said forming plane;

(c) by means of a rapid and intense electric current pulse discharged from a capacitor battery of a power source generating an abrupt and intense force and applying it onto said plate to force it towards said mold, whereby said plate is formed to assume a 3-D shape corresponding to contours of the mold while edged portions of the plate being bent about said rounded edges; and (d) applying through an auxiliary pulsed magnetic force (PMF) device with an auxiliary forming coil, a PMF force onto said edge portion in a direction which is essentially normal to said edge portion against a shearing line defined between a face having said edged portion and a wall portion normal thereto, whereby said edge portion is cut along said shearing line.

2. A method according to claim 1, wherein the formed metal plate is a satellite dish.

3. An apparatus for forming a metal plate comprising:

a mold with a forming plane which in operation faces the plate, having rounded edges;

a device comprising a power source with a capacitor battery that can generate a rapid and intense electric current discharge that in turn causes the generation of an abrupt and a intense force pulse in an axis essentially normal to said forming plane that is applied onto said plate to force it towards said mold and to force edge portions of the plate to bend about said rounded edges; and an auxiliary pulsed magnetic force (PMF) device which has an auxiliary forming coil for generating a PMF onto and in a direction essentially normal to the bent edge portions of the plate against an edged portion retaining surface provided with shearing lines defined between said surface with both portions perpendicular thereto;

in edge-shearing state of the apparatus the bent edge portion is retained between said surface and said auxiliary forming coil with said shearing line being opposite said auxiliary forming coil, whereby upon discharge of current through said auxiliary forming coil, said edged portion is cut along said shearing lines.

4. An apparatus according to claim 3, wherein said auxiliary forming coil is associated with said mold and the shearing line is defined in an annular member, which in said edge-trimming operational state is placed such that said shearing line is opposite said auxiliary forming coil.

5. An apparatus according to claim 3, wherein said edge shearing line is defined in side walls of mold and the forming coil is received within auxiliary coil-holding member which in the edge shearing operational state of the device is in a position such that said auxiliary coil lies opposite said shearing line.

* * * * *